(12) United States Patent
Yang et al.

(10) Patent No.: US 6,952,354 B1
(45) Date of Patent: Oct. 4, 2005

(54) SINGLE STAGE PFC POWER CONVERTER

(75) Inventors: Ta-yung Yang, Milpitas, CA (US); Song-Yi Lin, Taipei (TW); Tso Min Chen, Taichung (TW)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 10/859,811

(22) Filed: Jun. 3, 2004

(51) Int. Cl.$^7$ ............................................. H02M 3/335
(52) U.S. Cl. ...................... 363/16; 363/21.12
(58) Field of Search .................... 363/16, 20, 21.01, 363/21.12, 39, 40

(56) References Cited

U.S. PATENT DOCUMENTS

| | | | | |
|---|---|---|---|---|
| 6,031,748 A | * | 2/2000 | Hong | 363/89 |
| 6,507,500 B2 | * | 1/2003 | Liang | 363/16 |
| 6,538,906 B1 | * | 3/2003 | Ke et al. | 363/21.02 |
| 6,717,827 B2 | * | 4/2004 | Ota | 363/21.12 |
| 6,862,194 B2 | * | 3/2005 | Yang et al. | 363/16 |
| 6,862,197 B2 | * | 3/2005 | Eriksson | 363/21.04 |

FOREIGN PATENT DOCUMENTS

DE        3133578 A1 *    3/1983    .......... H02M 3/325

* cited by examiner

*Primary Examiner*—Adolf Berhane
(74) *Attorney, Agent, or Firm*—J.C. Patents

(57) ABSTRACT

A single stage PFC power converter is provided for performing a PFC function in a half-bridge flyback power converter. A high-side switch and a low-side switch periodically supply an input voltage to a primary winding of a transformer. When the high-side switch and low-side switch are switched off, the energy stored in the transformer will be transmitted to a secondary circuit and charged to a bulk capacitor. The bulk capacitor serves to recycle the energy and reduce the output ripple noise. A forward diode and a forward inductor serve to forward the energy of the bulk capacitor to the flowing path of the input voltage for performing PFC function.

8 Claims, 6 Drawing Sheets

SINGLE STAGE PFC POWER CONVERTER

BACKGROUND OF THE INVENTION

1. Field of the Invention

The present invention relates to a power converter, and more particularly, to a power factor correction (PFC) power converter in single stage.

2. Description of the Related Art

Power converters have widely served to convert an unregulated power source to a regulated voltage or current. A PFC (Power Factor Correction) technique is applied to make an input current follow the waveform of an input voltage. Adding a PFC stage to the front end of a power converter substantially avoids unnecessary power losses and heat dissipation in a power contribution system.

Referring to FIG. 1, a power converter having two stages according to prior art is illustrated. A first stage is a PFC stage, which includes an inductor 13, a rectifier 16 and a transistor 10. The transistor 10 is driven by a control signal PFC from the PFC stage. A second stage includes a transistor 15 controlled by a control signal PWM, a transformer 50 and a secondary circuitry, thus output voltage is regulated and output ripple noise is reduced. However, the PFC stage configuration increases the cost and device counts of the power converter, and hence efficiency of the power converter is reduced. Therefore, the development trend of power converters is to build a single stage power converter with PFC function. The present invention provides a single stage PFC power converter to reduce the cost and the size, i.e. device counts, and to improve efficiency of the power converter. The present invention also reduces output ripple noise. The present invention can further provide a power converter operating in lower stress to obtain higher reliability.

SUMMARY OF THE INVENTION

The present invention provides a single stage power factor correction (PFC) power converter that performs a PFC function to a half-bridge flyback power converter. The single stage PFC power converter includes a transformer having a primary winding coupled to a high side switch and a low-side switch in series, and a secondary winding coupled to a secondary circuit. The high-side and low-side switches periodically couple an input voltage to the primary winding of the transformer. Once the high-side switch and the low-side switch are switched off, an energy stored in the transformer will be transmitted to the secondary circuit. Meanwhile the energy will be charged to a bulk capacitor through a first flyback diode and a second flyback diode. When the input voltage is lower than the voltage across the bulk capacitor, an energy stored in the bulk capacitor will be used to power the secondary circuit, which reduces the output ripple noise. A forward diode and a forward inductor serve to forward the energy of the bulk capacitor to the flowing path of the input voltage for performing PFC function.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE PREFERRED EMBODIMENTS

Figure 2:
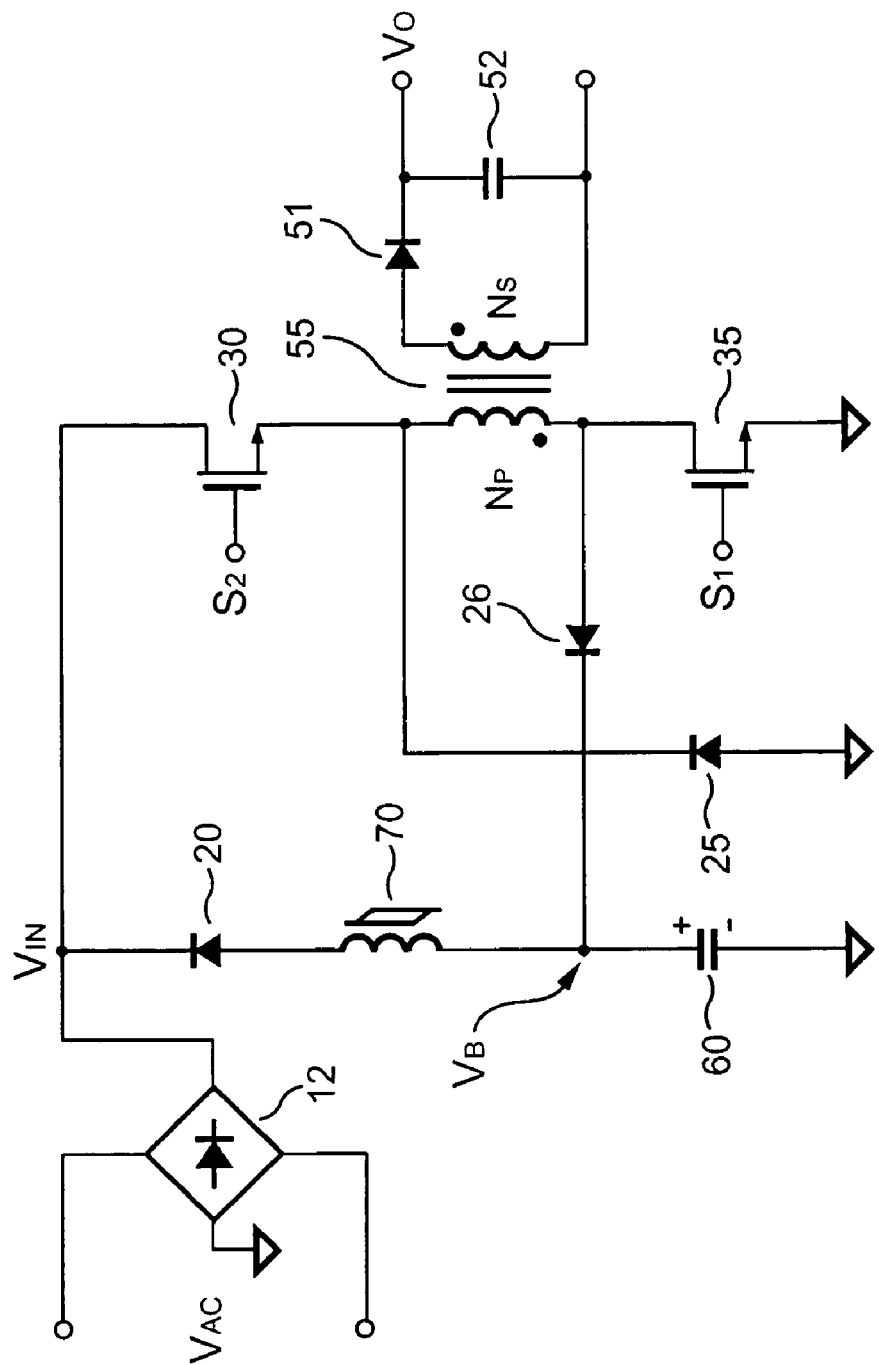
FIG. 2 is a schematic diagram illustrating a single stage PFC power converter according to one embodiment of the present invention.

Referring to FIG. 2, a single stage power factor correction (PFC) power converter according to an embodiment of the present invention is illustrated. The single stage PFC power converter includes a transformer 55 having a primary winding $N_P$, a secondary winding $N_S$, a secondary circuit, a high-side switch 30, a low-side switch 35, flyback diodes 25 and 26, a forward diode 20, a bulk capacitor 60, a forward inductor 70, and a bridge rectifier 12. The bridge rectifier 12 rectifies an AC line voltage $V_{AC}$ to an input voltage $V_{IN}$. A first terminal of the high-side switch 30 is supplied with the input voltage $V_{IN}$. A second terminal of the high-side switch 30 is connected to a second terminal of the primary winding $N_P$. A first terminal of the primary winding $N_P$ is coupled to a first terminal of the low-side switch 35. A second terminal of the low-side switch 35 is coupled to a ground reference level. The secondary winding $N_S$ of the transformer 55 is coupled to the secondary circuit. The secondary circuit includes an output rectifier 51 having an anode coupled to a first terminal of the secondary winding $N_S$ and a cathode coupled to an output capacitor 52. The output capacitor 52 is coupled to the output terminals of the power converter in parallel. The first terminal of the primary winding $N_P$ and the first terminal of the secondary winding $N_S$ possess same polarity. The high-side switch 30 and the low-side switch 35 periodically couple the input voltage $V_{IN}$ to the primary winding $N_P$ of the transformer 55. When the input voltage $V_{IN}$ is applied to the primary winding $N_P$, a magnetized energy $\epsilon_P$ will be stored in the transformer 55. The magnetized energy $\epsilon_P$ is given by, $$\varepsilon_P = \frac{1}{2} \times L_P \times I_P^2 \tag{1}$$

Figure 3A:
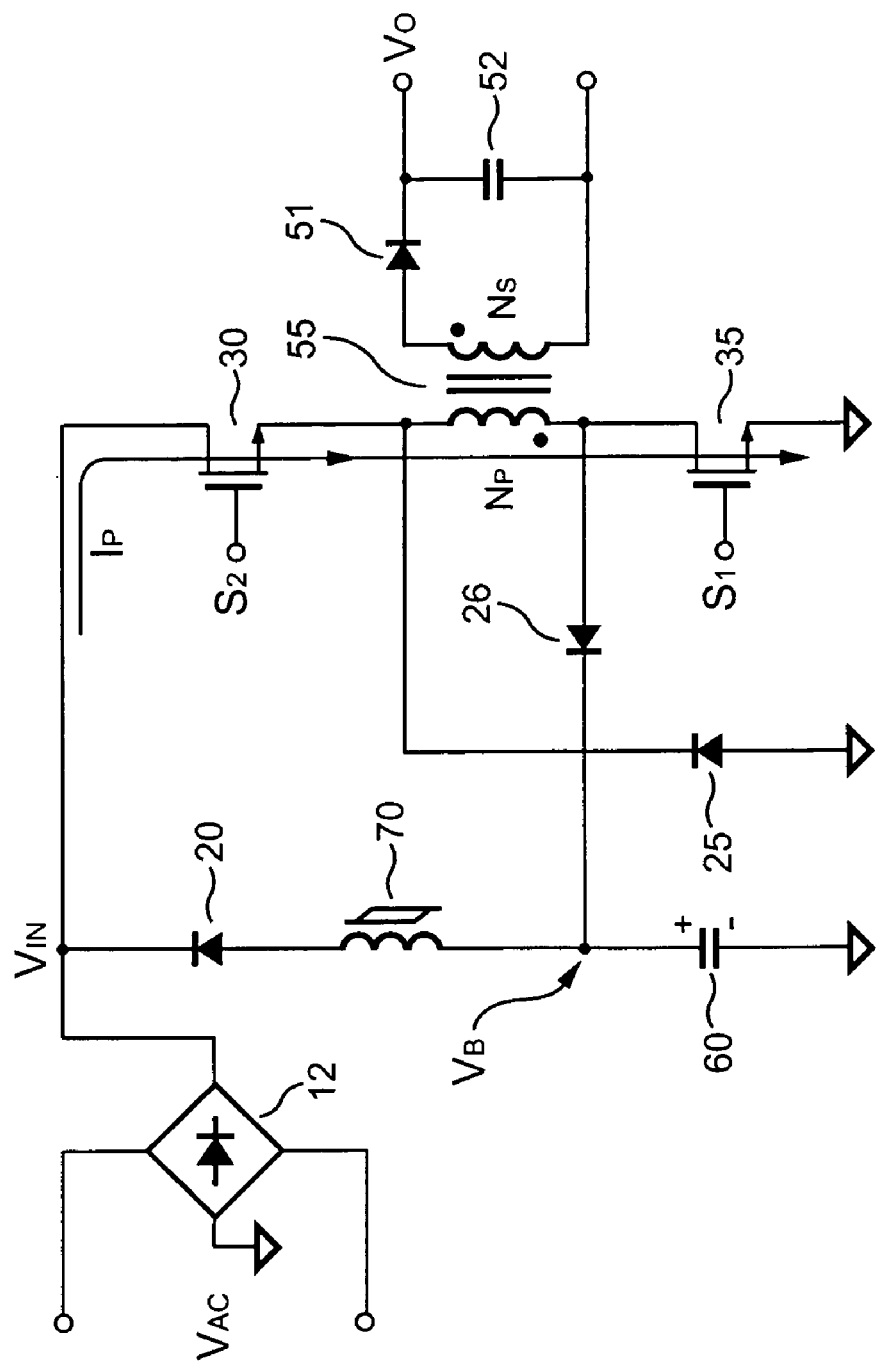
FIG. 3a is a schematic diagram of the single stage PFC power converter illustrating a high-side switch and a low-side switch being switched on according to one embodiment of the present invention.

Referring to FIG. 3a, the transformer 55 magnetized by a primary current $I_P$ when the high-side switch 30 and the low-side switch 35 are switched on according to one embodiment of the present invention is illustrated. Meanwhile an energy $\epsilon_I$ is stored in the leakage inductor $L_I$ of the transformer 55. The leakage inductor $L_I$ indicates a magnetic flux that cannot be transferred to the secondary side of the transformer 55.

$$\varepsilon_I = \frac{1}{2} \times L_I \times P_P^2 \qquad (2)$$

An anode of the flyback diode 25 is coupled to the ground reference level and a cathode of the flyback diode 25 is coupled to the second terminal of the primary winding $N_P$. An anode of the flyback diode 26 is coupled to the first terminal of the primary winding $N_P$. A cathode of the flyback diode 26 is coupled to a positive terminal of the bulk capacitor 60. A negative terminal of the bulk capacitor 60 is coupled to the ground reference level. The forward diode 20 is coupled to the forward inductor 70 in series. A cathode of the forward diode 20 is coupled to the input voltage $V_{IN}$, and an anode of the forward diode 20 is coupled to a terminal of the forward inductor 70. The other terminal of the forward inductor 70 is coupled to the positive terminal of the bulk capacitor 60.

Figure 3B:
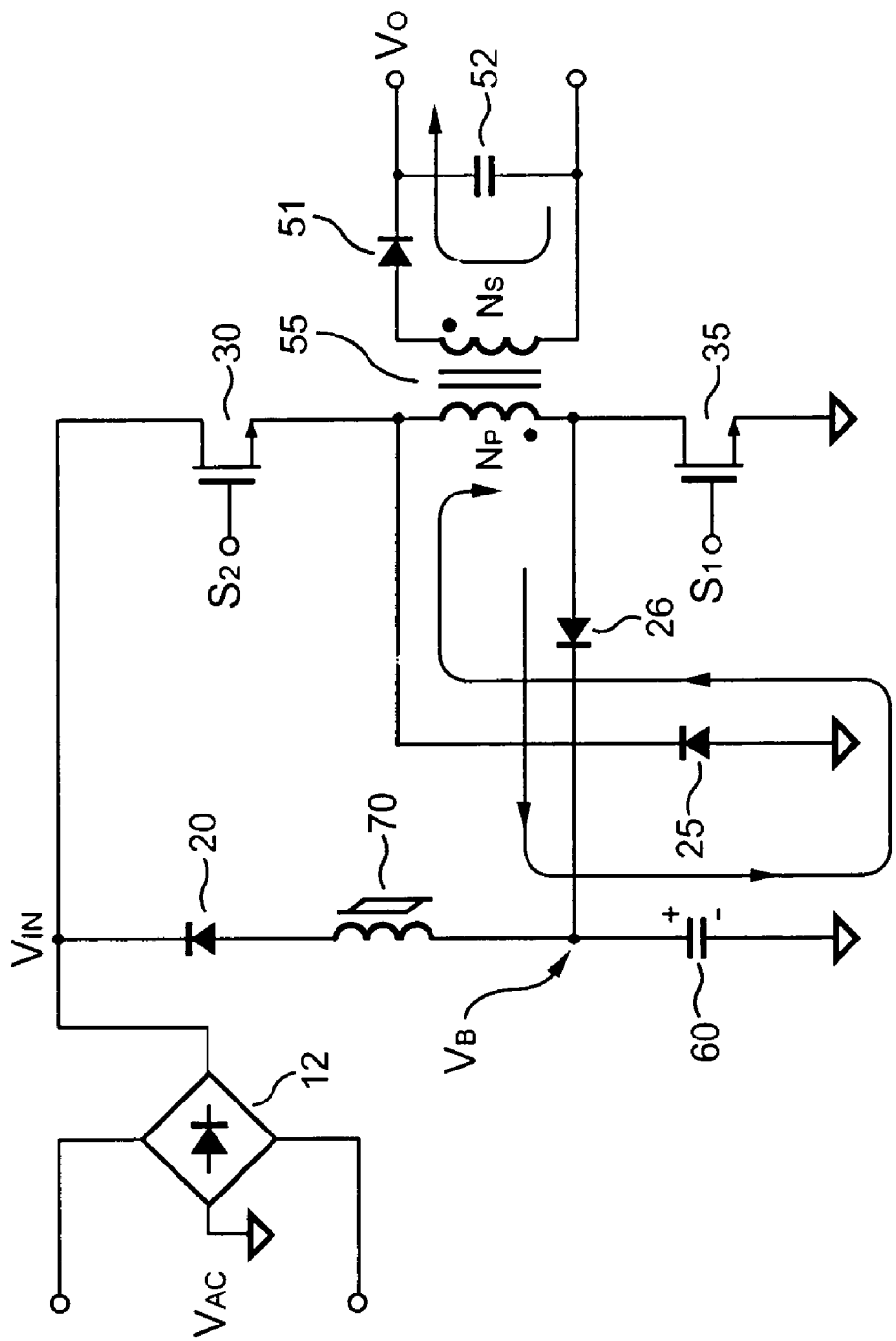
FIG. 3b is a schematic diagram of the single stage PFC power converter illustrating the high-side switch and the low-side switch being switched off according to one embodiment of the present invention.

Referring to FIG. 3*b*, the magnetized energy $\epsilon_P$ stored in the transformer 55 is transmitted to the secondary circuit through the secondary winding $N_S$ as the high-side switch 30 and the low-side switch 35 are both switched off according to one embodiment of the present invention. Meanwhile, the bulk capacitor 60 is charged by the energy $\epsilon_P$ and $\epsilon_I$ through the flyback diodes 25 and 26. When the input voltage $V_{IN}$ is higher than a voltage $V_B$ across the bulk capacitor 60, the forward diode 20 is reverse-biased. Therefore, a main switching current is only provided by the input voltage $V_{IN}$ as the high-side switch 30 and the low-side switch 35 are both switched on.

The forward diode 20 and the forward inductor 70 serve to forward the energy of the bulk capacitor 60 to the flowing path of the input voltage $V_{IN}$. When the input voltage $V_{IN}$ is lower than the voltage $V_B$ across the bulk capacitor 60, the energy stored in the bulk capacitor 60 will start to power the secondary circuit, which reduces the output ripple noise. Regardless of the energy stored in the leakage inductor of the transformer 55, a turn-ratio of the transformer 55 and an output voltage $V_O$ determine the voltage $V_B$ across the bulk capacitor 60. The voltage $V_B$ is given by, $$V_B = \frac{N_P}{N_S} \times V_O \qquad (3)$$

Figure 4:
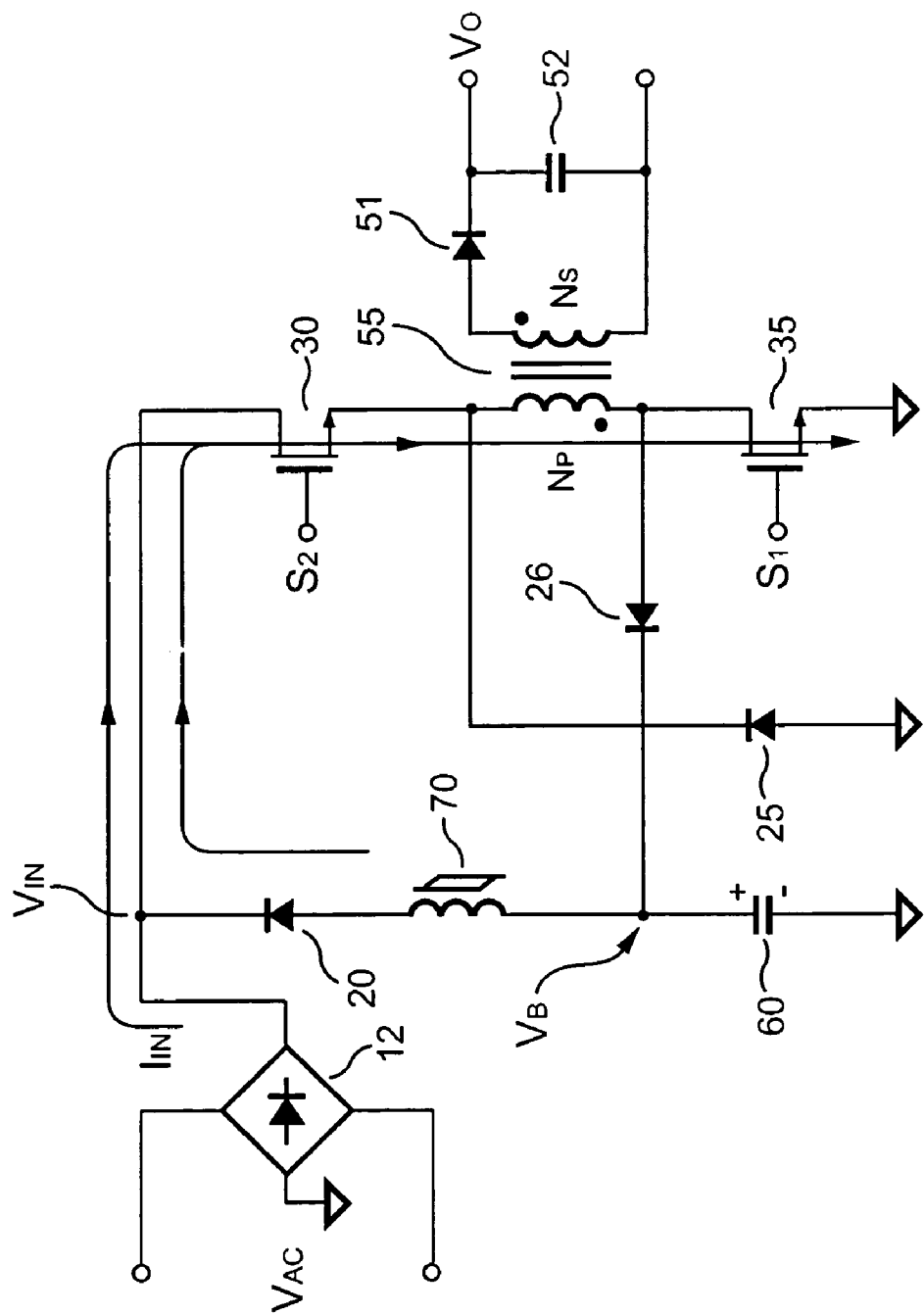
FIG. 4 is a schematic diagram of the single stage PFC power converter illustrating the status when an input voltage is lower than a voltage of a bulk capacitor according to one embodiment of the present invention.
Figure 5:
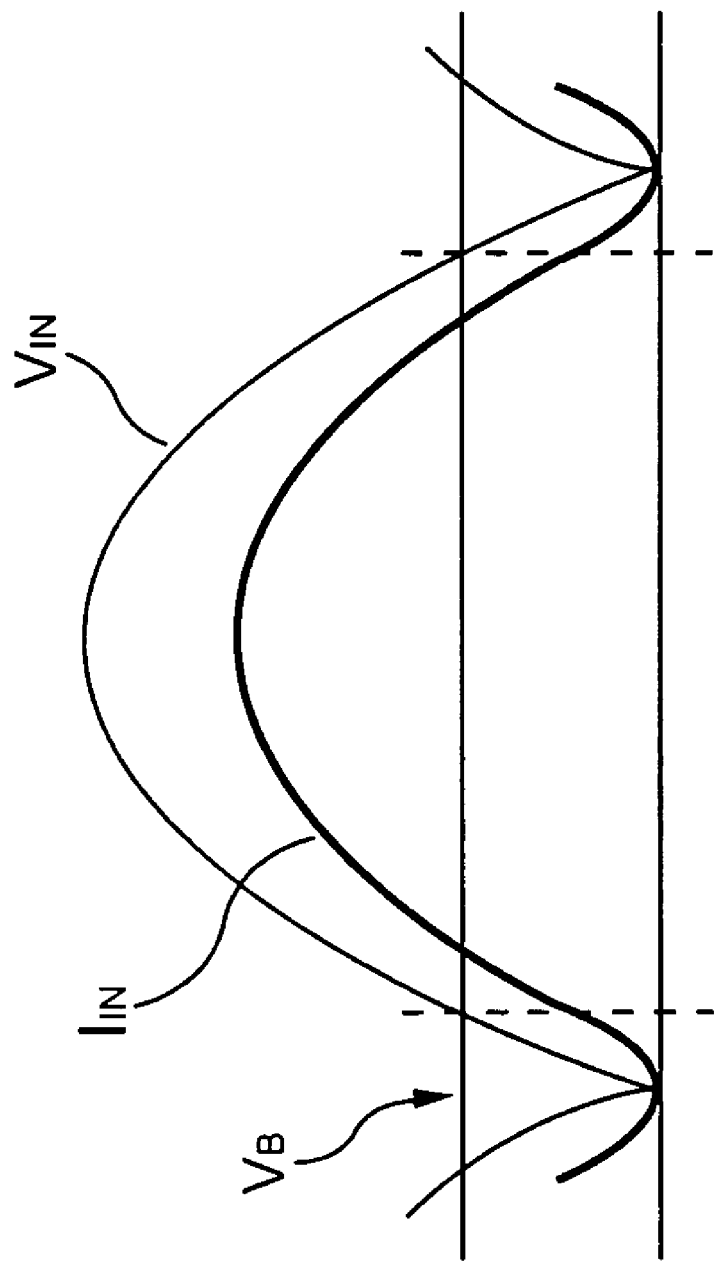
FIG. 5 is a schematic waveform diagram of an input current and the input voltage of the single stage PFC power converter according to one embodiment of the present invention.

Referring to FIG. 4, the current flowing through the high-side switch 30 and the low-side switch 35 when the input voltage $V_{IN}$ is lower than the voltage $V_B$ of the bulk capacitor 60 according to one embodiment of the present invention is illustrated. The forward inductor 70 provides a propagation delay for an auxiliary current that is supplied by the bulk capacitor 60. The input voltage $V_{IN}$ provides the main switching current before the forward inductor 70 is saturated. Therefore, the input current waveform is improved with superior PFC performance. Referring to FIG. 5, the waveforms of the input current $I_{IN}$ and the input voltage $V_{IN}$ are depicted.

Figure 1:
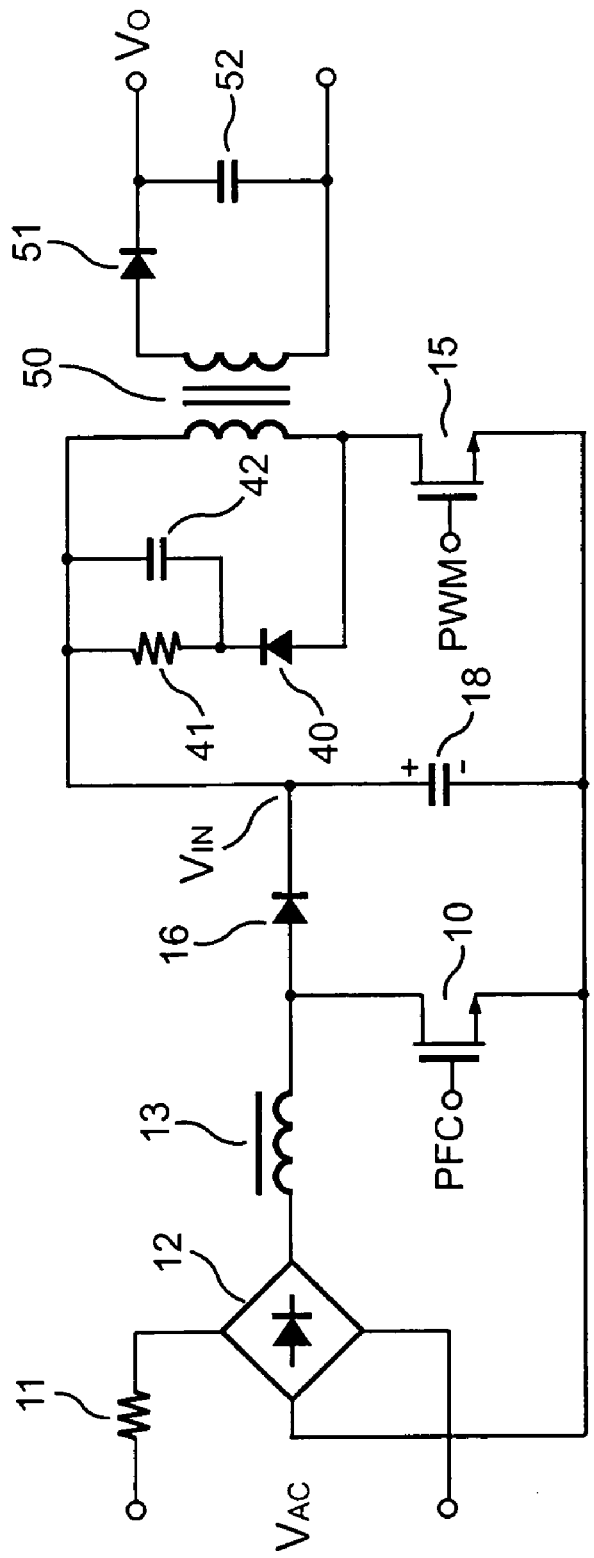
FIG. 1 is a schematic diagram illustrating a power converter according to prior art.

Referring to FIG. 1, a capacitor 42 and a snubber resistor 41 serving to store and consume the energy of the leakage inductor of the transformer 50 according to one embodiment of prior art are illustrated. The energy of the leakage inductor must be completely dissipated; otherwise the drain voltage of the transistor 15 will continuously increases until the power consumption in the snubber resistor 41 fully dissipates the energy of the leakage inductor. The equation is shown as, $$\frac{V_{R41}^2}{R_{41}} = \frac{1}{2} \times L_I \times I_P^2 \times f \qquad (4)$$

where $V_{R41}$ is the voltage across the snubber resistor 41; $R_{41}$ is the resistance of the snubber resistor 41; and f is the switching frequency.

The leakage inductor of the transformer consumes major power and reduces the efficiency of the power converter. Besides, the operating voltage $V_{DS}$ of the transistor 15 can be expressed as:

$$V_{DS} = V_{IN} + V_{R41} \qquad (5)$$

From equation (5), it is known that the operating stress of the transistor 15 will be increased with respect to $V_{R41}$.

Furthermore, an NTC (negative temperature coefficient) thermistor 11 shown in the FIG. 1 serves to avoid a current surge of the power converter. A current surge will be generated when the power converter is turned on due to the charge of the capacitor 18. The current surge reduces the reliability of the power converter. In addition, the NTC thermistor increases the power consumption and operating temperature.

According to the single stage PFC power converter in the present invention, the energy of the leakage inductor is stored into the buck capacitor 60. No snubber component is needed for dissipating the energy stored in the leakage inductor. This energy is further recycled for supplying the secondary circuit. Therefore, the power efficiency of the power converter is improved. Moreover, the voltage $V_B$ of the bulk capacitor 60 clamps the operating voltage of the low-side switch 35. The input voltage $V_{IN}$ clamps the operating voltage of the high-side switch 30. Compared to conventional power converters, the voltage stress of the high-side switch 30 and the low-side switches 35 of the present invention can be reduced.

According to the topology of the present invention, no current surge will be generated. The high-side switch 30 blocks the path from the input voltage $V_{IN}$ to the bulk capacitor 60. The bulk capacitor 60 can only be gradually charged by the magnetized energy $\epsilon_P$ of the transformer 55 and the energy $\epsilon_I$ of the leakage inductor, which eliminates the need of NTC thermistor and further improves the efficiency and the reliability of the power converter.

Although the invention has been described with reference to a particular embodiment thereof, it will be apparent to those skilled in the art that modifications to the described embodiment may be made without departing from the spirit of the invention. Accordingly, the scope of the invention will be defined by the attached claims and not by the above detailed description.

What is claimed is:

1. A single stage PFC power converter, comprising:
   a bridge rectifier, rectifying an AC line voltage to an input voltage;
   a transformer, having a primary winding and a secondary winding, wherein said secondary winding is coupled to a secondary circuit, and a first terminal of said primary winding and a first terminal of said secondary winding have same polarity;
   a high-side switch;

a low-side switch, wherein said high-side switch is coupled between said input voltage and a second terminal of said primary winding, said low-side switch is coupled between said first terminal of said primary winding and a ground reference level;

a first flyback diode, wherein an anode of said first flyback diode is coupled to said ground reference level and an cathode of said first flyback diode is coupled to said second terminal of said primary winding;

a second flyback diode, wherein an anode of said second flyback diode is coupled to said first terminal of said primary winding;

a bulk capacitor, wherein a positive terminal of said bulk capacitor is coupled to a cathode of said second flyback diode and a negative terminal of said bulk capacitor is coupled said ground reference level;

a forward inductor; and a forward diode, wherein a cathode of said forward diode is coupled to said input voltage, an anode of said forward diode is coupled to a first terminal of said forward inductor; and a second terminal of said forward inductor is coupled to said positive terminal of said bulk capacitor.

2. The single stage PFC power converter in claim 1, wherein said high-side switch and said low-side switch periodically couple said input voltage to said primary winding of said transformer.

3. The single stage PFC power converter in claim 1, wherein when said high-side switch and said low-side switch are switched off, an energy stored in said transformer is transmitted to said secondary circuit and charged to said bulk capacitor through said first flyback diode and said second flyback diode.

4. The single stage PFC power converter in claim 1, wherein said forward diode and said forward inductor serve to forward an energy of said bulk capacitor to a flowing path of said input voltage.

5. The single stage PFC power converter in claim 1, wherein when said input voltage is lower than a voltage across said bulk capacitor, said energy of said bulk capacitor serve to supply said secondary circuit, which reduces an output ripple noise of the power converter.

6. The single stage PFC power converter in claim 1, wherein said forward inductor provides a propagation delay for an auxiliary switching current that is supplied by said bulk capacitor, and a main current that is supplied by said input voltage before said forward inductor is saturated.

7. The single stage PFC power converter in claim 1, wherein an energy of a leakage inductor of said transformer is stored to said bulk capacitor when said high-side switch and said low-side switch are turned off.

8. The single stage PFC power converter in claim 1, wherein said high-side switch blocks a path from said input voltage to said bulk capacitor when turned off, and said bulk capacitor is charged by a magnetized energy of said transformer and said energy of said leakage inductor of said transformer.

\* \* \* \* \*